United States Patent
Gekas et al.

(10) Patent No.: US 8,997,465 B2
(45) Date of Patent: Apr. 7, 2015

(54) METHOD FOR PURIFICATION OF EXHAUST GAS FROM A DIESEL ENGINE

(75) Inventors: Ioannis Gekas, Malmö (SE); Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 853 days.

(21) Appl. No.: 13/147,418

(22) PCT Filed: Dec. 16, 2009

(86) PCT No.: PCT/EP2009/009017
§ 371 (c)(1),
(2), (4) Date: Aug. 2, 2011

(87) PCT Pub. No.: WO2010/094313
PCT Pub. Date: Aug. 26, 2010

(65) Prior Publication Data
US 2011/0283680 A1  Nov. 24, 2011

(30) Foreign Application Priority Data
Feb. 20, 2009 (DK) ................................ 2009 00236

(51) Int. Cl.
*F01N 3/00* (2006.01)
*F01N 3/025* (2006.01)
(Continued)

(52) U.S. Cl.
CPC ............ *F01N 3/0253* (2013.01); *B01D 53/944* (2013.01); *B01D 53/9477* (2013.01); *F01N 3/103* (2013.01); *F01N 3/106* (2013.01); *F01N 3/2066* (2013.01); *F01N 9/002* (2013.01); *F01N 13/0093* (2014.06); *F01N 13/009* (2014.06); *B01D 53/9418* (2013.01); *B01D 2251/206* (2013.01); *B01D 2251/2062* (2013.01); *B01D 2251/2067* (2013.01);
(Continued)

(58) Field of Classification Search
CPC ... F02D 41/029; F02D 41/0275; F01N 9/002; F01N 3/0842; F01N 3/035; F01N 3/0814; F01N 3/2066; F01N 13/02
USPC ............................ 60/274, 286, 295, 301, 311
See application file for complete search history.

(56) References Cited

U.S. PATENT DOCUMENTS 6,696,031 B1 *  2/2004  Twigg et al. ................... 423/212
6,928,806 B2 *  8/2005  Tennison et al. ................ 60/286
(Continued)

FOREIGN PATENT DOCUMENTS

DE      10 2004 049 289 A1     4/2006
DE         102004049289 A1 *   4/2006
(Continued)

*Primary Examiner* — Thomas Denion
*Assistant Examiner* — Patrick Maines
(74) *Attorney, Agent, or Firm* — Dickstein Shapiro LLP

(57) ABSTRACT

The invention provides a method for purification of exhaust gas from a diesel engine in a system, which comprises a device for selective catalytic reduction and a diesel particulate filter preferably at least partially covered by a catalytic layer installed downstream of the device for selective catalytic reduction. A device for catalytic oxidation is installed upstream of the device for selective catalytic reduction and/or between the device for selective catalytic reduction and the diesel particulate filter. A device for injection of a controlled amount of reductant is installed inlet of the device for selective catalytic reduction, and a device for injection of a controlled amount of hydrocarbon is installed inlet of the catalytic oxidation.

14 Claims, 3 Drawing Sheets

(51) Int. Cl.
  *B01D 53/94* (2006.01)
  *F01N 3/10* (2006.01)
  *F01N 3/20* (2006.01)
  *F01N 9/00* (2006.01)
  *F01N 13/00* (2010.01)
  *B01J 23/22* (2006.01)
  *B01J 29/072* (2006.01)

(52) U.S. Cl.
  CPC .. *B01D 2251/208* (2013.01); *B01D 2255/1021* (2013.01); *B01D 2255/1023* (2013.01); *B01D 2255/20707* (2013.01); *B01D 2255/20723* (2013.01); *B01D 2255/20738* (2013.01); *B01D 2255/20761* (2013.01); *B01D 2255/407* (2013.01); *B01D 2255/50* (2013.01); *B01D 2255/915* (2013.01); *B01D 2258/012* (2013.01); *B01J 23/22* (2013.01); *B01J 29/072* (2013.01); *F01N 2560/08* (2013.01); *F01N 2610/02* (2013.01); *F01N 2610/03* (2013.01); *Y02T 10/47* (2013.01); *Y02T 10/24* (2013.01)

(56) References Cited

U.S. PATENT DOCUMENTS

| | | | |
|---|---|---|---|
| 2008/0066454 A1* | 3/2008 | Viola | 60/286 |
| 2008/0124514 A1 | 5/2008 | Fujdala et al. | |
| 2008/0127638 A1 | 6/2008 | Vaarkamp et al. | |
| 2009/0178393 A1* | 7/2009 | Norsk et al. | 60/286 |
| 2009/0255236 A1* | 10/2009 | Collier et al. | 60/297 |
| 2009/0260346 A1* | 10/2009 | Gekas et al. | 60/274 |
| 2011/0182789 A1* | 7/2011 | Broll | 423/212 |
| 2011/0314793 A1* | 12/2011 | Mullins et al. | 60/274 |
| 2012/0144802 A1* | 6/2012 | Driscoll et al. | 60/274 |

FOREIGN PATENT DOCUMENTS

| | | | | |
|---|---|---|---|---|
| EP | 1 990 511 A2 | 11/2008 | | |
| JP | 2003-49637 A | 2/2003 | | |
| JP | 2008-121629 A | 5/2008 | | |
| JP | 2008-255905 A | 10/2008 | | |
| JP | 2008-274896 A | 11/2008 | | |
| WO | WO 2006/066043 A1 | 6/2006 | | |
| WO | WO 2006066043 A1 * | 6/2006 | | |
| WO | WO 2007131807 A1 * | 11/2007 | | F01N 3/08 |

* cited by examiner

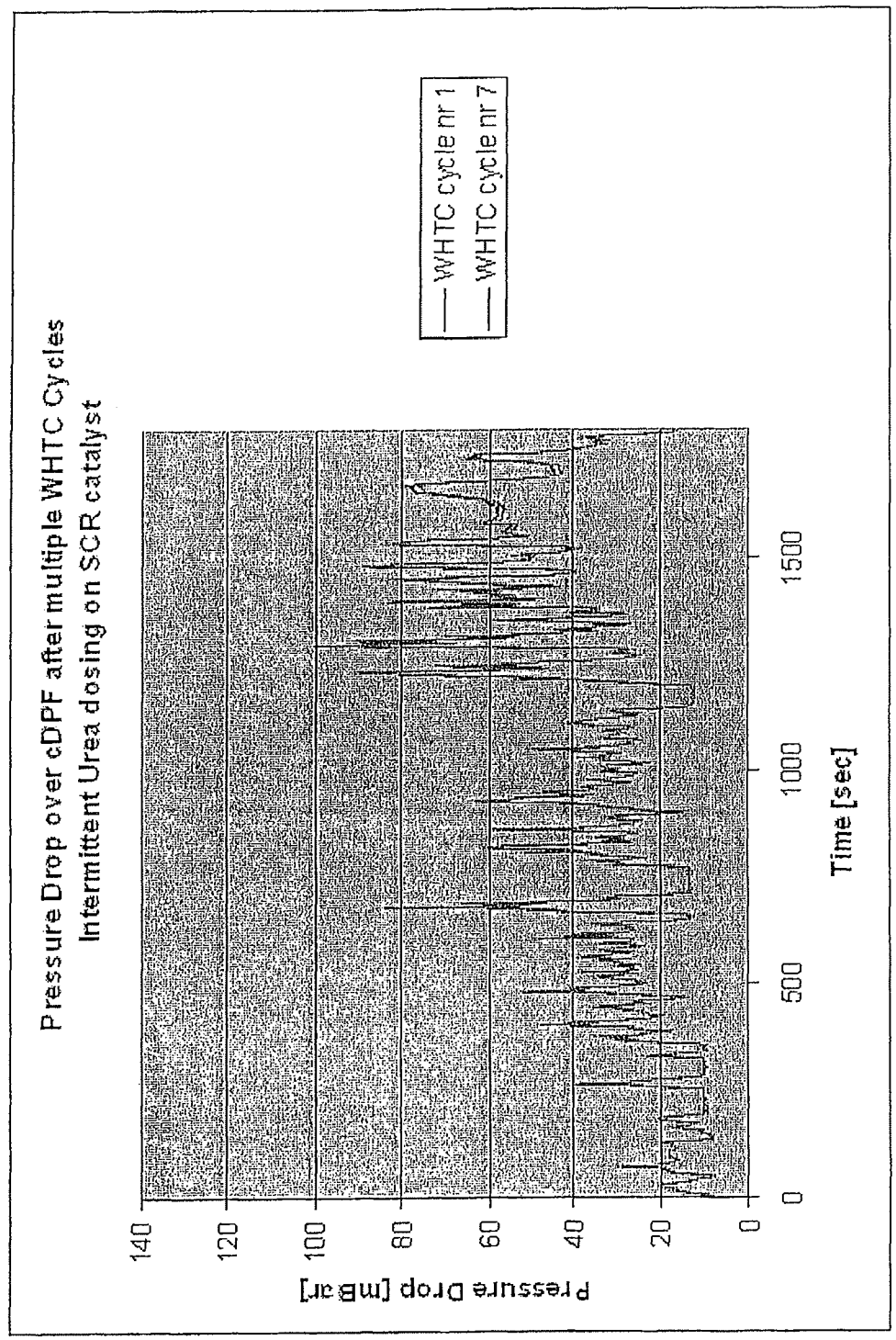

METHOD FOR PURIFICATION OF EXHAUST GAS FROM A DIESEL ENGINE

The invention relates to purification of exhaust gas from a diesel engine. Particles, incompletely combusted hydrocarbons, carbon oxide, CO, and nitrogen oxides, $NO_x$ are removed from the exhaust gas.

The invention is specifically directed to a purification method including an effective, but simple method for filter regeneration.

Methods for exhaust gas purification are already known. In U.S. Pat. No. 6,863,874 a method is described, where impurities in an exhaust gas are removed by oxidation followed by a filter, where soot is oxidised by nitrogen dioxide and oxygen. Further downstream, reductant is injected inlet a $NO_x$ absorber and subsequently a three-way catalyst or a catalyst for selective reduction is installed.

Another process is disclosed in U.S. Pat. No. 6,696,031, where impurities are removed by oxidation, filtering, and selective catalytic reduction (SCR). Ammonia is injected upstream of the oxidation or SCR, and further upstream of this, a pre-oxidation catalyst is installed, to which hydrocarbon may be introduced. A computer must control the two ammonia streams.

Impurities from an exhaust gas are by the method of U.S. Pat. No. 6,871,489 removed by passing the gas through an oxidation catalyst, a cooler, equipped with a by-pass, a SCR section including urea injection, through a heater and finally a diesel particulate filter. In this way, the filter must be regenerated by elevating the temperature of the filter by increasing the heat output from the heater.

These processes are either complicated, energy demanding or having slow urea decomposition simultaneously with slow catalytic reduction of $NO_x$ at start of cold engine.

It is the general object of this invention to provide a purification process, which effectively removes particles, incompletely combusted hydrocarbons, carbon oxide, CO, and nitrogen oxides, $NO_x$, from an exhaust gas and regenerates the filter and at the same time is very simple.

The invention provides a method for purification of exhaust gas from a diesel engine in a system, which comprises a device for selective catalytic reduction and a diesel particulate filter preferably at least partially covered by a catalytic layer and installed downstream of the device for selective catalytic reduction. A device for catalytic oxidation is installed upstream of the device for selective catalytic reduction and/or between the device for selective catalytic reduction and the catalysed diesel particulate filter. A device for injection of a controlled amount of reductant is installed inlet of the device for selective catalytic reduction, and a device for injection of a controlled amount of hydrocarbon is installed inlet of the catalytic oxidation.

The invention provides that the catalysed diesel particulate filter is passively regenerated by closing the injection of reductant and the catalysed diesel particulate filter is actively regenerated by opening for the injection of hydrocarbon inlet of at least one device for catalytic oxidation and optionally closing for the injection of reductant. The filter is passively regenerated by $NO_2$ at a temperature up to 500° C. and actively regenerated at a temperature from 500° C. to 700° C.

The reductant is ammonia, aqueous solution of ammonia, urea, an aqueous solution of urea, cyanuric acid. Other potential nitrogen based reagents include ammelide, ammelinge, ammonium cyanate, biuret, ammonium carbamate, ammonium carbonate, ammonium formate, melamine, and tricyanourea. Ammonia, aqueous solution of ammonia, urea, an aqueous solution of urea, cyanuric acid are prefered.

The hydrocarbon is fuel, preferably fuel to the diesel engine. The selective catalytic reduction takes place in presence of a vanadium based catalyst, or a zeolite based catalyst, or a functionalized acidic base metal oxide mixture. The vanadium based catalyst is vanadium oxide on titanium oxide with possible addition of tungsten- or molybdenum oxides. The zeolite based catalyst comprises copper and/or iron modified beta zeolite, ZSM-5 or chabasite and the functionalized acidic base metal oxide mixture comprises acidic cerium-zirconium oxide mixtures and zirconium-titanium oxide mixtures. The vanadium based catalyst is used from 150° C. to 550° C. and the zeolite based catalyst or the acidic base metal mixture catalyst is used from 150° C. to 800° C.

When a first oxidation catalyst is installed upstream of the selective catalytic reduction device, and a second oxidation catalyst is installed between the selective catalytic reduction device and the diesel particulate filter, then ammonia can be injected inlet the first oxidation catalyst. The first oxidation catalyst comprises platinum and palladium on lanthanum oxide promoted aluminium oxide, or platinum and palladium on silicon oxide promoted titanium oxide, or platinum and palladium on zirconium oxide promoted cerium oxide. The second oxidation catalyst comprises palladium on lanthanum oxide promoted aluminium oxide, or palladium oxide on silicon promoted titanium oxide, or palladium on zirconium oxide promoted cerium oxide, or mixture of copper and manganese oxides or palladium on a mixture of copper and manganese oxides.

The catalytic layer on the diesel particulate filter comprises a mixture of base metal oxides in possible combination with precious metals as palladium and platinum. A special advantageous example with palladium on cerium oxide zirconium oxide mixture is described in EP 1 916 029.

The pressure drop across the filter is measured and a created signal is used for controlling addition of reducing agent and addition fuel.

The invention further comprises a system for performing the above mentioned method.

This system secures fast cold start of the selective reduction catalyst and very high NOx conversions are obtained. By active on/off management of the reducing agent and hydrocarbon injection both passive and active regeneration of the catalyzed filter is secured.

This invention is very useful in cleaning an exhaust gas from a diesel engine, which is installed in motor vehicles, typically cars, vans, trucks, and also vessels. Also in power plants driven by diesel engines the exhaust gas can advantageously be cleaned by the process of the invention.

FIG. 6 is a graph similar to FIG. 5, but with intermittent urea dosing, showing the pressure drop increasing after multiple cycles, evidencing that soot is building up on the filter.

Diesel engines operate with excess air and their exhaust gasses comprise nitrogen oxides, $NO_x$, carbon monoxide, CO, particulate matter and incompletely combusted hydrocarbons, which all implement health risk.

Figure 1:
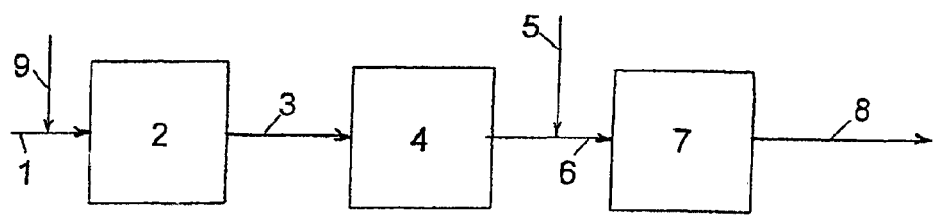
FIG. 1 is a schematic drawing of a process for purification of exhaust gas according to known technology.

The invention basically comprises three processes during normal purification of exhaust gas:

Catalytic oxidation, where
  CO, NO and HC react with $O_2$ to form $CO_2$, $NO_2$ and $H_2O$ and heat
Selective catalytic reduction, where
  NO and $NO_2$ are typically reduced by $NH_3$ to form $N_2$ and $H_2O$
And catching particles in a catalytically coated filter, where
  CO, C, HC, and possible slip of $NH_3$ are oxidised to $N_2$, $CO_2$ and $H_2O$
  C refers here to particulate matter or soot deposited on the diesel particulate filter When the particles however are accumulated on the filter, the filter can be regenerated by oxidising with nitrogen dioxide, base metal oxide of the filter coating or at higher temperatures with oxygen in the exhaust gas:
  C and HC are oxidised by NO, $NO_2$ and/or $O_2$ to form $N_2$, $CO_2$ and $H_2O$ The presently used diesel exhaust system technology (known technology) is characterized in having a SCR catalyst downstream catalyzed filter as shown in FIG. 1.

Exhaust gas 1 flows from an engine to an oxidation catalyst 2, the oxidized exhaust gas 3 is then passed to diesel particulate filter 4. After this reductant 5 is injected into the exhaust gas, and the mixed exhaust gas 6 is then introduced into a catalyst 7 for selective catalytic reduction, SCR, from where the exhaust gas 8 leaves the catalyst 7 cleaned. When increased temperatures are needed, hydrocarbon 9 is post injected in the engine or injected into exhaust gas 1 between the engine and oxidation catalyst 2. This is further described in below process (1).

(1) Engine→DOC→cDPF→$Urea_{inj}$→zSCR where DOC is a diesel oxidation catalyst containing Pt for $NO_2$ formation, and cDPF is a catalyzed soot filter that also can contain Pt for $NO_2$ formation.

$Urea_{inj}$ is injected reductant, typically an aqueous solution of urea, zSCR is a zeolithic based SCR catalyst or a functionalized acidic base metal oxide mixture During forced regeneration of the filter with filter inlet temperatures around 600° C. the system will be as (2) Engine→$HC_{inj}$→DOC→cDPF→zSCR where $HC_{inj}$ is hydrocarbon, which is injected into exhaust gas from the engine and upstream of DOC.

Passive regeneration of soot with $NO_2$ takes place in the configuration as shown in process (1).

This system has several drawbacks. The heat up and the start of the SCR reaction from cold start are slow, and the total $NO_x$ emission, also measured in a test cycle, will be high. The start is also slow, as injection of urea requires minimum 200° C. Further, the zSCR catalyst shall be able to withstand filter regeneration temperatures of at least 750° C., and also operation with zSCR normally requires managed $NO_2$/NO ratio, which is disturbed by the cDPF as particulate matter also reacts with $NO_2$ in filter. Finally, the system is very expensive.

Figure 2:
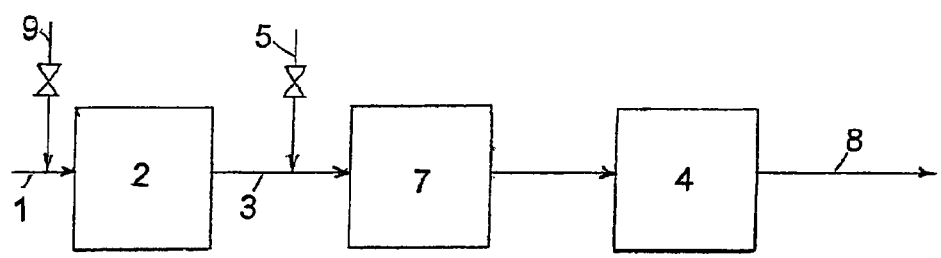
FIG. 2 is a schematic drawing of a process for purification of exhaust gas according to one preferred embodiment of the process of the invention.

A preferred embodiment of present invention is shown in FIG. 2. Exhaust gas 1 from an engine is passed through an oxidation catalyst 2, a catalyst 7 for selective catalytic reduction and as last step through a diesel particulate filter 4. Reductant 5 is injected between oxidation catalyst 2 and the SCR catalyst 7. Hydrocarbon 9 can be injected upstream of oxidation catalyst 2.

The new diesel exhaust system with the reverse configuration, SCR upfront cDPF, is further described in below process (3). It further comprises a new, special management.

(3) Engine→DOC→$Urea_{inj}$→zSCR→cDPF where zSCR is a zeolith based SCR catalyst or a functionalized acidic base metal oxide mixture catalyst, which tolerates minimum 750° C.

cDPF is a diesel particulate filter preferably catalytically coated. In this embodiment it is especially advantageous to use a palladium base metal oxide coating as the commercially available BMC-211 catalyst from Haldor Topsøe A/S and described in patent application EP 1 916 029. This catalyst limits possible $NO_2$ emission and facilitates soot combustion in the temperature range 300-600° C.

DOC is a diesel oxidation catalyst, which can have different compositions. This catalyst is precious metal(s) on promoted metal oxide carriers that typically is applied on monolithic skeleton substrates as cordierite, silicon carbide mullite or Fecralloy. It contains typically platinum. It comprises platinum and palladium on lanthanum oxide promoted aluminium oxide, or platinum and palladium on silicon oxide promoted titanium oxide, or platinum and palladium on zirconium oxide promoted cerium oxide.

This invention will secure filter soot regeneration effectively both for passive and active conditions in diesel exhaust systems, where the SCR catalyst is placed upstream of cDPF. It further secures high NO conversion at cold start. Soot combustion with $O_2$ in the exhaust gas takes place in the temperature range above 575° C. during active regeneration. Passive $NO_2$ regeneration, which is soot combustion using $NO_2$, can take place in the temperature range of 250-ca ca 450° C. Finally, passive catalyst soot combustion can also take place in a catalysed filter. In the temperature interval of 300-600° C. a base metal catalyst BMC-211 can facilitate soot combustion.

An active regeneration in system (3) takes place at ca 620° C. filter inlet temperature with diesel post injection in the engine by simultaneously stopping the urea injection as shown in below process (4). In this system it is required that the SCR catalyst for instance zeolithic SCR catalyst can withstand the temperature (4) Engine→$HC_{inj}$→DOC→zSCR→cDPF $Tfilter_{in}$=620° C. for 10 minutes Process (3) has many advantages compared to present technology, but seems to have one drawback during passive filter regeneration by nitrogen dioxide. Present invention solves this seeming drawback of system (3) of very low $NO_2$ concentration downstream the SCR compared to system with a SCR catalyst downstream catalyzed filter as shown in known technology process (1). The present invention secures passive regeneration of the soot filter with $NO_2$.

The present invention also involves active management of system (3) or (4). The invention comprises that the $NO_2$ concentration is temporary increased in short time intervals by stopping the urea injection, so $NO_2$ is formed for the passive regeneration and diesel fuel can be saved. This temporary $NO_2$ increase is started, when the pressure drop across the catalyzed filter has increased to a preset value, and the filter inlet temperature has reached a preset value, which should be at least 250° C. Then system (3) will function like shown in system process (5).

(5) Engine→DOC→zSCR→cDPF

In the temperature range ca 300-400° C., the $NO_2$/NO will be optimal for a high $NO_2$ content. The $NO_2$ concentration and the effect of passive soot combustion can be further increased by temporary closing for the engine Exhaust Gas Recirculation (EGR) as shown below by (6) concurrently with urea injection is stopped as shown in (5).

(6) Engine (noEGR)→DOC→zSCR→cDPF

A further improvement of system (3) can be achieved by injection of ammonia ($NH_3$) in stead of urea, which requires heat both for water evaporation and for urea decomposition. Then the SCR reaction can start from about 150° C. and the SCR catalyst can be placed much closer to the diesel oxidation catalyst DOC as $NH_3$ mixing can take place within a few centimetre exhaust pipe length f. ex 5 cm.

Lower $NO_x$ out of the exhaust system is then achieved on the road and when tested by any governmental standard test cycle.

The system with enhanced passive regeneration by stopped $NH_3$ injection is shown by processes (5) and (6).

A further possible improvement of system (5) is to inject ammonia ($NH_3$) upstream the DOC. By doing this extra $NO_2$ is formed in the DOC and is used for passive regeneration. At the same time, the temperature in the system is increased. This is shown below for with and without exhaust gas recycle.

(7) Engine→$NH3_{inj}$DOC→zSCR→cDPF (8) Engine(noEGR)→$NH3_{inj}$DOC→zSCR→cDPF

System (3) has special interest for passenger cars with diesel post injection options.

Figure 3:
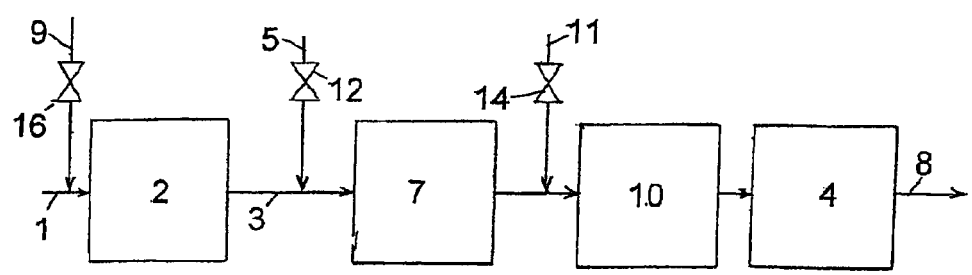
FIG. 3 is a schematic drawing of a process for purification of exhaust gas according to another preferred embodiment of the process of the invention.

Another preferred embodiment of the invention is shown in FIG. 3, where it is shown that exhaust gas 1 from the engine passes successively a first oxidation catalyst 2, selective reduction catalyst 7, a second oxidation catalyst 10 and finally the diesel particulate filter 4. Hydrocarbon 9 and 11 can be added to the exhaust gas stream upstream of the first 2 and the second 10 oxidation catalyst, while reductant 5 is injected inlet the selective reduction catalyst 7. Out of the filter 4 flows the cleaned exhaust gas stream 8.

The amount of reductant 5 is controlled by valve 12. This will receive a signal from f. inst. a pressure difference measurement across the filter 4, and the valve 12 will close in order to start the passive regeneration. Similarly, when a need to increase the temperature in or outlet one of the oxidation catalysts 2, 10, valve 16 and/or 14 will open. Optionally ammonia might be added here. This embodiment is further described below. Normal operation is described by (9) Engine→DOC(1)→$Urea_{inj}$→SCR→$HC_{inj}$DOC(2)→cDPF.

This is an important example and called Haldor Topsøe reverse standard system Euro VI system. SCR can either be vanadium based SCR or zeolithic SCR or a functionalized acidic base metal oxide mixture. During active regeneration the process is

(10) Engine→DOC(1)
→$NH3_{inj}$→zSCR→$HC_{inj}$→DOC(2)→cDPF.

And at cold start and with simultaneous active regeneration

(11) Engine→$NH3_{inj}$→DOC(1)
→$NH3_{inj}$→zSCR→$HC_{inj}$→DOC(2)→cDPF.

By $NH_3$ injection to the first upstream DOC (1) cold start performance can be improved by the generated heat, and the $NO_2$/NO ratio will be more optimal for the SCR reaction on zSCR as well.

The DOC (1) is the DOC described for system (3).

The DOC (2) catalyst is precious metals on promoted metal oxide carriers that typically is applied on monolithic skeleton substrates as cordierite, silicon carbide mullite or Fecralloy. This catalyst can also be a mixture of base metal oxides with or without precious metals that typically is applied on monolithic skeleton substrates as cordierite, silicon carbide mullite or Fecralloy. It contains typically not platinum. It comprises palladium on lanthanum oxide promoted aluminium oxide, or palladium oxide on silicon promoted titanium oxide, or palladium on zirconium oxide promoted cerium oxide, or mixture of copper and manganese oxides or palladium on a mixture of copper and manganese oxides.

Figure 4:
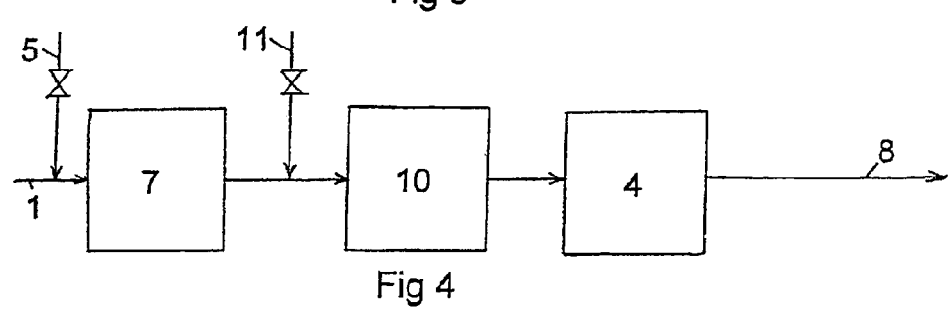
FIG. 4 is a schematic drawing of a process for purification of exhaust gas according to yet another preferred embodiment of the process of the invention.

System (9) is advantageous for both trucks and passenger car applications. A third preferred embodiment is shown in FIG. 4. Here the exhaust gas 1 from the engine is passed through selective catalytic reduction 7, catalytic oxidation 10 and finally through filter 4. Reductant 5 is added the exhaust gas 1 and hydrocarbon 11 can be added between selective catalytic reduction 7 and catalytic oxidation 10.

The advantage with this exhaust system is that the maximum inlet temperature to the SCR catalyst can be the same as engine outlet temperature, which is approximately 550° C. This system will facilitate that a standard vanadium based SCR catalyst (V-SCR) can be selected. By use of V-SCR the process will be

(12) Engine→$Urea_{inj}$→V-SCR→$HC_{inj}$→DOC→cDPF

Copper based zeolite SCR catalysts, Cu-zSCR, may be used as the selected SCR catalyst as it is less dependant on the $NO_2$/NO ratio, but it requires a Cu-zSCR type, which tolerates HC emission from the engine.

The system with $NH_3$ injection instead of urea for SCR reaction and with simultaneous active regeneration will be as

(13) Engine→$NH3_{inj}$→V-SCR→$HC_{inj}$→DOC→cDPF

In system (13) the distance from engine manifold to the V-SCR catalyst can be decreased by a factor 10, from 50 cm to 5 cm. So at cold start engine heat is not used for heating superfluous pipe lengths but for start of the chemical reactions. System (13) will during managed passive regeneration, where $NH_3$ injection is stopped, temporarily be

(14) Engine→V-SCR→DOC→cDPF and equivalent without EGR

(15) Engine(noEGR)→V-SCR→DOC→cDPF

System (12) has special interest for truck applications

EXAMPLE 1

Engine test bench experiments on a Scania 12 liter engine with a SCR+DOC+cDPF system gives unchanged soot load pressure drop after 7 world harmonized test cycles with intermittent urea dosing and temporary high $NO_2$ content.

Measurement of pressure drop over cDPF for the 1st and 7th repeated world harmonized test cycles (WHTC) measured in one day where the system was managed with both low and high dosing of urea.

Figure 5:
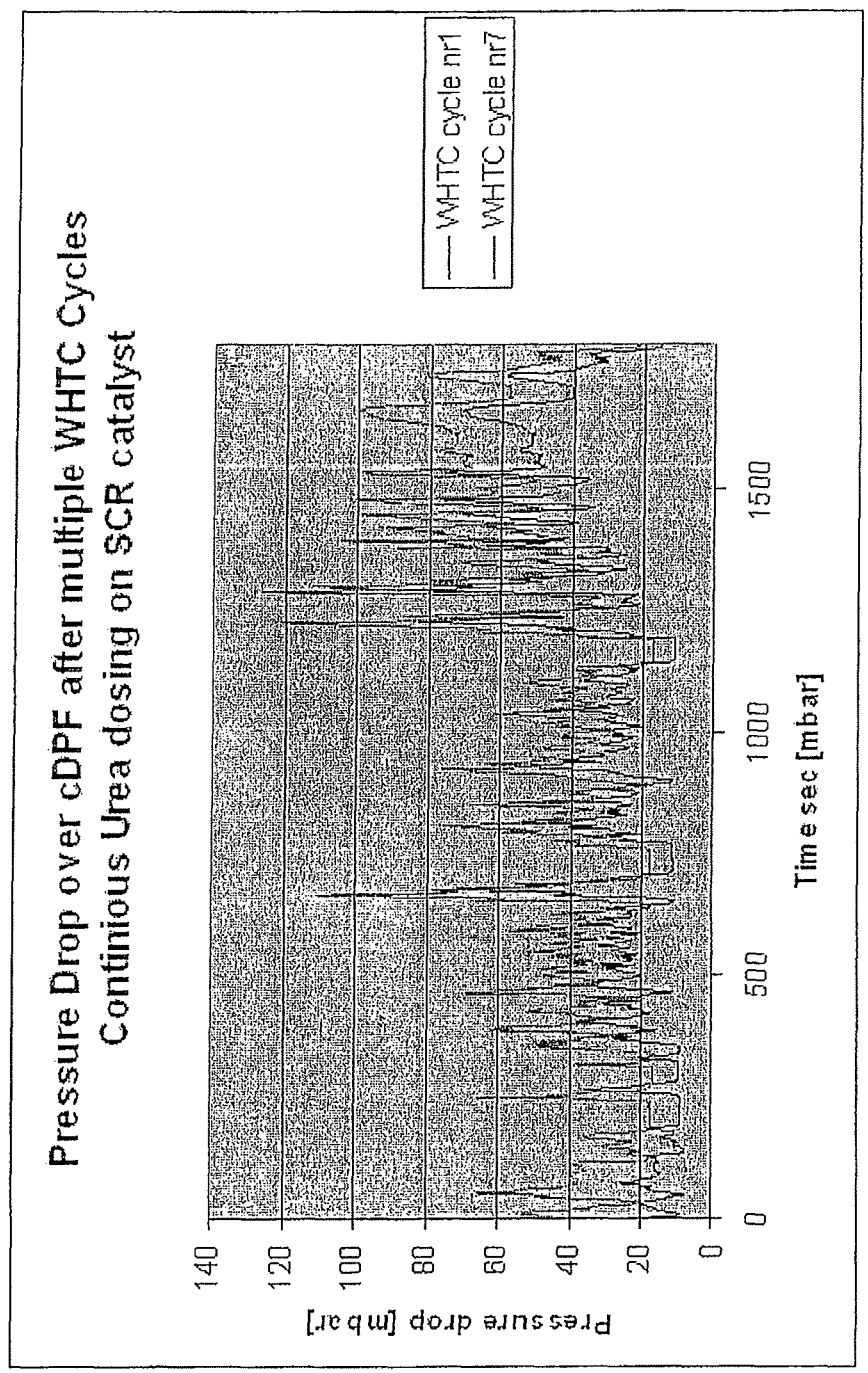
FIG. 5 is a graph of pressure drop with continuous urea dosing on SCR catalyst, showing no pressure drop increase from additional soot loading.

In FIG. 5 the two curves are identical, consequently they are written in top of each other. This means that no pressure drop increase from additional soot loading is seen. This result shall be compared to the reference example below.

In this reference example the urea dosing is continuous and high for high SCR reaction. This gives low $NO_2$ and NOx (approximately 1-2 g NOx/kWh) exit the SCR catalyst—inlet cDPF). In FIG. 6, we see in contrast to the FIG. 5 above the pressure drop increases from first WHTC to $7^{th}$ cycle. This means that soot is building up on the filter.

The invention claimed is:

1. A method for purification of exhaust gas from a diesel engine in a system, the method comprising the steps of:
   providing:
   a catalyst for selective catalytic reduction;
   a diesel particulate filter at least partially covered by a catalytic layer installed downstream of the catalyst for selective catalytic reduction; and
   a first catalyst for catalytic oxidation installed upstream of the catalyst for selective catalytic reduction and/or a second catalyst for catalytic oxidation installed between the catalyst for
   selective catalytic reduction and the diesel particulate filter;
   injecting a controlled amount of reductant at an inlet of the catalyst for selective catalytic reduction; and
   injecting a controlled amount of hydrocarbon at an inlet of the catalyst for catalytic oxidation;
   wherein the diesel particulate filter is passively regenerated by closing the injection of the reductant;
   wherein the diesel particulate filter is actively regenerated by opening the injection of the hydrocarbon at inlet of at least one of the first and second catalysts for catalytic oxidation.

2. The method according to claim 1, wherein the filter is passively regenerated by $NO_2$ at a temperature up to 500° C.

3. The method according to claim 1, wherein the filter is actively regenerated at a temperature from 500° C. to 700° C.

4. The method according to claim 1, wherein the reductant is ammonia, aqueous solution of ammonia, urea, an aqueous solution of urea, cyanuric acid, ammelide, ammelinge, ammonium cyanate, biuret, ammonium carbamate, ammomium carbonate, ammonium formate, melamine, or tricyanourea.

5. The method according to claim 4, wherein the reductant is ammonia, aqueous solution of ammonia, urea, an aqueous solution of urea or cyanuric acid.

6. The method according to claim 1, wherein the hydrocarbon is same fuel as to the diesel engine.

7. The method according to claim 1, wherein the catalyst for selective catalytic reduction is a vanadium based catalyst or a zeolite based catalyst or a functionalized acidic base metal mixed oxide catalyst.

8. The method according to claim 7, wherein the vanadium based catalyst is vanadium oxide on titanium oxide with addition of tungsten- or molybdenum oxides, the zeolite based catalyst is copper and/or iron modified beta zeolite, ZSM-5 or chabasite, and the functionalized acidic base metal mixed oxide catalyst comprises acidic cerium- zirconium oxide mixtures and zirconium-titanium oxide mixtures.

9. The method according to claim 7, wherein the vanadium based catalyst is used at temperatures from 150° C. to 550° C. and the zeolite based catalyst is used at temperatures from 150° C. to 800° C.

10. The method according to claim 1, wherein the catalytic layer on the diesel particulate filter comprises a mixture of base metal oxides in combination with precious metals preferably palladium and platinum.

11. The method according to claim 1, wherein a first oxidation catalyst is installed upstream of the catalyst for selective catalytic reduction and a second oxidation catalyst is installed between the catalyst for selective catalytic reduction and the diesel particulate filter and ammonia is injected inlet the first oxidation catalyst.

12. The method according to claim 1, wherein the catalyst for catalytic oxidation installed upstream of the catalyst for selective catalytic reduction comprises platinum and palladium on lanthanum oxide promoted aluminium oxide, or platinum and palladium on silicon oxide promoted titanium oxide, or platinum and palladium on zirconium oxide promoted cerium oxide; and
   the catalyst for catalytic oxidation installed downstream of the catalyst for selective catalytic reduction palladium on lanthanum oxide promoted aluminium oxide, or palladium on silicon oxide promoted titanium oxide, or palladium on zirconium oxide promoted cerium oxide, or mixture of copper and manganese oxides or palladium on a mixture of copper and manganese oxides.

13. The method according to claim 1, wherein pressure drop across the filter is measured and a created signal is used for controlling addition of reducing agent and addition of hydrocarbon.

14. The method according to claim 1, wherein the diesel particulate filter is actively regenerated by additionally closing the injection of the reductant.

* * * * *